C. LEWIS.
TIRE INFLATING PUMP.
APPLICATION FILED MAY 12, 1910.
975,774.
Patented Nov. 15, 1910.
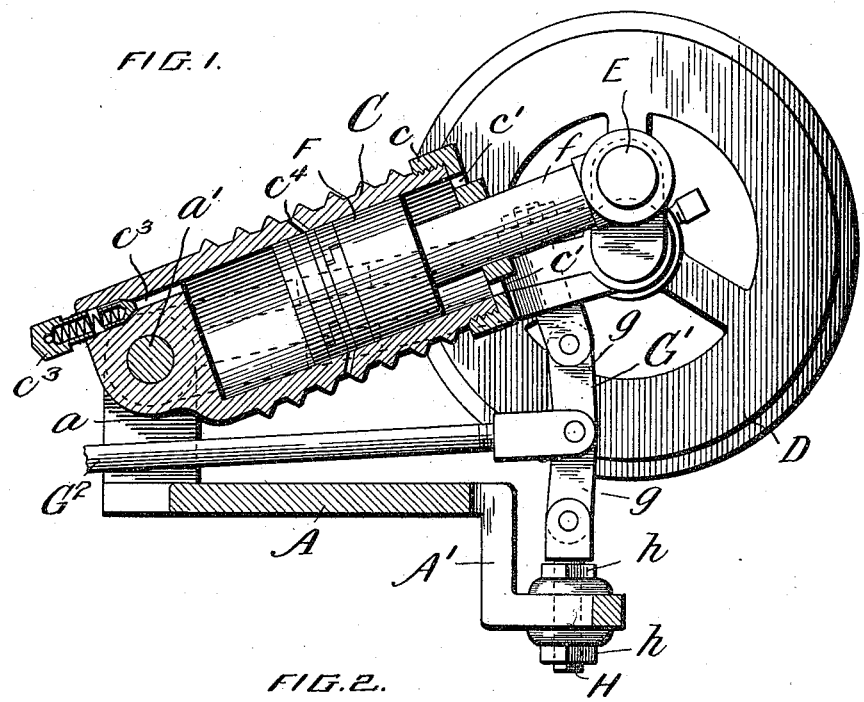
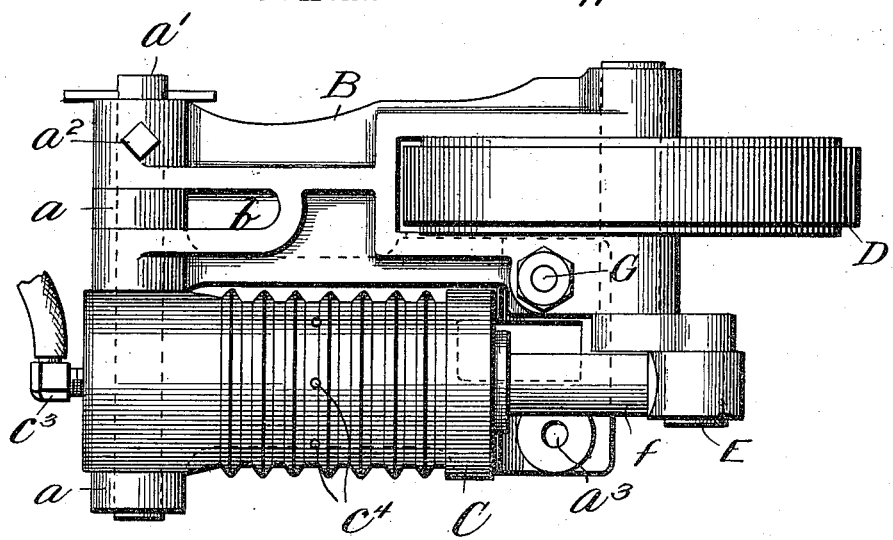
WITNESSES:
INVENTOR
Charles Lewis
BY
Attorney,

UNITED STATES PATENT OFFICE.

CHARLES LEWIS, OF AUBURN, NEW YORK, ASSIGNOR OF ONE-HALF TO HENRY WEGMAN, OF AUBURN, NEW YORK.

TIRE-INFLATING PUMP.

975,774. Specification of Letters Patent. Patented Nov. 15, 1910.

Application filed May 12, 1910. Serial No. 560,991.

*To all whom it may concern:*

Be it known that I, CHARLES LEWIS, citizen of the United States, residing at Auburn, in the county of Cayuga and State of New York, have invented certain new and useful Improvements in Tire-Inflating Pumps; and I do hereby declare the following to be a full, clear, and exact description of the invention, such as will enable others skilled in the art to which it appertains to make and use the same.

My present invention relates to the class of automobile tire inflating pumps and more particularly to that portion of said class of devices in which the pump is actuated by a friction or other actuating wheel adapted to be thrown into and out of contact with the fly or other wheel of the motor of the automobile or with some other moving part of the mechanism.

In the accompanying drawings, I have shown the best form in which I have contemplated embodying my said invention and the invention is disclosed in the following description and claims.

In the said drawings, Figure 1 is a view of the pump at a right angle to view in Fig. 2 with the frame and pump cylinder in section. Fig. 2 is a view of my improved pump looking at the cylinder side of the same.

The device is designed to be placed in vertical, horizontal or other position as it may be found most convenient in the machine with which it is to be connected.

In the drawings A is the main frame to which the other parts are attached. The frame A is provided with ears $a\ a$ extending at right angles from the frame. A secondary frame B is pivoted upon the bolt or shaft $a'$ which passes through the ears $a\ a$ of the frame A. The pump cylinder C is also pivoted upon the same bolt or shaft. The secondary frame B is bifurcated at the end through which the rod or shaft $a'$ passes forming the recess $b$ and one of the ears $e$ is in said recess. The other ear $a$ is on the outside of the pump cylinder. The bolt or shaft $a'$ is rigidly secured to the secondary frame by the set screw $a^2$ and the frame, the pump cylinder and the secondary frame are thus secured together by the single bolt or shaft. The free end of the secondary frame is also bifurcated providing a larger recess for the reception of the actuating or friction wheel D. This wheel is mounted on and rigidly secured to the crank shaft E, which is journaled in bearings in the parts of the frame on opposite sides of the wheel D. This construction distributes the pressure upon the wheel equally on the shaft E on each side of the wheel and prevents cramping of the shaft in its bearing or bearings and secures additional durability. The wheel may be secured upon the shaft in any preferred manner. It should, however, be removably secured so that the position of the shaft can be reversed to enable the pump to be applied in places where the device can be more conveniently worked with the cylinder on the opposite side of the secondary frame.

The piston F is a solid body made of one or more parts as shown in the drawing and the piston rod $f$ is rigidly connected therewith. The piston rod works through an opening in the cap $c$ applied to the free end of the cylinder. The pump cylinder is oscillated on the rod or shaft $a'$ when in operation by the crank shaft E in a well known way. The cap forms a guide for the piston rod, thus preventing any cramping of the piston in the cylinder and any irregular wear of the interior of the same by reason of the oscillation of the cylinder by the piston and crank. The cap $c$ is provided with a number of small openings $c'$ for the passage of air therethrough during the reciprocations of the piston. The secondary frame and friction wheel are moved to throw the wheel in frictional contact with a moving part of the machine by the following devices.

The main frame is provided with offset portion A' and this portion is provided with an opening $a^3$ as seen in Fig. 2 and another of like character in line with the bolt G in that figure. In one of these openings is inserted a bolt H, secured in place by nuts, $h, h$ one on each side of the frame. A bolt G is secured to the secondary frame B in like manner. The head of each of these bolts is provided with two ears and between these ears are pivoted the outer ends of the two members $g, g$ of the toggle lever G'. To the center of the toggle lever is pivotally secured the rod $G^2$ which is so placed or connected as to be easily moved by the operator to straighten the lever to throw the pump into action or to flex the same to withdraw it from operation. This toggle lever is constructed so that when it is moved to throw the friction wheel into contact with its actuating device its central pivot will ordinarily move a little past a straight line connecting its end pivots and then its movement will be arrested. In this position the pressure of the friction wheel will practically lock the lever from any return movement, and the pump will remain in operation until the toggle lever is flexed by the rod $G^2$.

The compressed air leaves the cylinder through the passage $c^2$ and said passage is provided with a check valve $c^3$ which closes immediately at the beginning of the back stroke of the piston. Air is admitted to the cylinder through the openings $c^4$ which are closed by the piston at the beginning of a compression stroke.

As before stated one of the objects sought to be secured is a construction that can be changed from a right handed to a left handed pump to accommodate it to use under conditions in which the one or the other may be found most desirable. It will readily be seen that this can be easily accomplished by the construction shown and described. To do this the toggle lever is disconnected from the main and secondary frames. The rod or shaft $a'$ and the crank shaft E are then removed, the secondary frame is oppositely faced and the recess $b$ made to engage the other ear $a$ of the main frame; the cylinder is then placed between the secondary frame and the ear $a$ from which the secondary frame has been removed; the crank shaft and shaft $a'$ are then inserted in a reverse position, and the toggle lever construction replaced. In this arrangement the bolt H is inserted in the opening $a^3$ of Fig. 2.

The bolts G and H being secured by the nuts on opposite sides of the frame, the toggle lever can be adjusted to bring the friction wheel D to the position desired when moved by the toggle lever. It will be seen that in addition to this feature the devices for moving the secondary frame and the friction wheel can be set in position to be moved from any direction found convenient in the structure to which it is applied.

What I claim and desire to secure by Letters Patent is:—

1. A tire inflating pump having a main frame, a secondary frame, a crank shaft and actuating wheel carried thereby, and a single bolt or shaft securing the said secondary frame and the cylinder of the pump to the main frame, whereby the said secondary frame and pump cylinder can be detached from the main frame by removing said bolt or shaft.

2. A tire inflating pump having a main frame, a secondary frame, a crank shaft and actuating wheel carried thereby, a piston rod connected to the crank of the crank shaft, and a single bolt or shaft connecting the said secondary frame and the pump cylinder to the main frame whereby the pump cylinder, piston and crank shaft can be detached from the main frame by removing said bolt or shaft.

3. A tire inflating pump having a main frame, a secondary frame carrying an actuating wheel, and an oscillating pump cylinder, the said secondary frame and the pump cylinder being pivoted to the main frame by a single bolt or shaft.

4. A tire inflating pump having a main frame, a secondary frame carrying an actuating wheel and crank shaft, an oscillating pump cylinder, the said secondary frame and the pump cylinder being pivoted to the main frame by a single bolt or shaft, and the said crank shaft being journaled in said secondary frame and connected with the pump piston, whereby the pump cylinder and the said secondary frame can be detached from the main frame by removing the said bolt or shaft.

5. A tire inflating pump having a main frame, a reversible crank shaft, an actuating wheel detachably mounted on said shaft, a pump cylinder, a piston therefor, removably connected with the crank of said shaft and means whereby the said cylinder may be connected to said main frame on the right or left side of the main frame.

6. A tire inflating pump having a main frame, a secondary frame carrying an actuating wheel and a pump cylinder, and means connecting the secondary frame and the pump cylinder to the main frame permitting the pump cylinder to be placed at the right or left of the secondary frame as desired.

7. A tire inflating pump having a main frame, a secondary frame carrying an actuating wheel, a pump operatively connected with said wheel, and means for moving said secondary frame to bring said wheel into position to be actuated, said means mounted to be adjusted to different positions around its longitudinal axis to permit of its being actuated from any direction.

8. A tire inflating pump having a main frame, a secondary frame carrying an actuating wheel and crank shaft, and an oscillating pump cylinder having its piston connected to said crank shaft, the said secondary frame and said pump cylinder being detachably connected to the main frame to permit of their positions upon the main frame being changed in respect to each other.

9. A tire inflating pump having a main frame, a secondary frame, a crank shaft mounted on said secondary frame an operating wheel on said shaft, a pump operatively connected with said shaft, a toggle lever connected at one end to the said secondary frame and at the other to the main frame, said connections being adjustable to permit of adjusting the toggle lever to properly position the actuating wheel when moved by it.

In testimony whereof I affix my signature, in the presence of two witnesses.

CHARLES LEWIS.

Witnesses:
 FRANK BUTTERFIELD,
 HENRY WEGMAN.